(12) United States Patent
Li

(10) Patent No.: US 8,818,137 B2
(45) Date of Patent: Aug. 26, 2014

(54) SYSTEM AND METHOD FOR PROCESSING IMAGE FILES OF AN ELECTRONIC DEVICE

(75) Inventor: Jun Li, Shenzhen (CN)

(73) Assignees: Shenzhen Futaihong Precision Industry Co., Ltd., Shenzhen (CN); Chi Mei Communication Systems, Inc., New Taipei (TW)

( * ) Notice: Subject to any disclaimer, the term of this patent is extended or adjusted under 35 U.S.C. 154(b) by 412 days.

(21) Appl. No.: 13/300,615

(22) Filed: Nov. 20, 2011

(65) Prior Publication Data

US 2012/0314976 A1   Dec. 13, 2012

(30) Foreign Application Priority Data

Jun. 13, 2011  (CN) .......................... 2011 1 0157302

(51) Int. Cl.
  *G06K 9/54*   (2006.01)
(52) U.S. Cl.
  USPC .......................................... 382/305; 715/251
(58) Field of Classification Search
  None
  See application file for complete search history.

(56) References Cited

U.S. PATENT DOCUMENTS

| 7,721,206 B2* | 5/2010 | Mirmotahari ................. 715/274 |
| 2003/0070146 A1* | 4/2003 | Sato et al. ..................... 715/525 |
| 2005/0283722 A1* | 12/2005 | Warmus et al. ............... 715/525 |

OTHER PUBLICATIONS

Red Titan EscapeE PCL Editor, User Guidel (from www.pclviewer.com, archive dates available 2010).*
PostScript Language Document Structuring Conventions Specification, 1992.*

* cited by examiner

*Primary Examiner* — Chan Park
*Assistant Examiner* — Mark Roz
(74) *Attorney, Agent, or Firm* — Novak Druce Connolly Bove + Quigg LLP

(57) ABSTRACT

In a system and method for processing images, a double-sided image format is set, and a new file with the double-sided image format is established. Specific content identifying the double-sided image format is written into a name domain of the new file, and data of a first image file is written as front image data into a data domain of the new file. The system further writes data of a second image file as back image data into the data domain after the front image data. Memory position of the front image data in the new file may be written into a front description domain of the new file according to a first byte number of the front image data. Memory position of the back image data may be written into a back description domain according to a second byte number of the back image data.

15 Claims, 3 Drawing Sheets

SYSTEM AND METHOD FOR PROCESSING IMAGE FILES OF AN ELECTRONIC DEVICE

BACKGROUND

1. Technical Field

Embodiments of the present disclosure relate to file format systems and methods, and more particularly to a system and method for processing image files of an electronic device.

2. Description of Related Art

Image files can be viewed on electronic devices, such as, mobile phones or computers, for example. These image files can come in many image formats such as, Bitmap (BMP), Graphics Interchange Format (GIF), Joint Photographic Experts Group (JPEG), for example. No matter what the format of the image files viewed on the electronic devices, users may view a plurality of image files together or one by one through special software. It's not convenient to use the special software for viewing a image files having a front side and a back side.

DETAILED DESCRIPTION

The disclosure is illustrated by way of example and not by way of limitation in the figures of the accompanying drawings in which like references indicate similar elements. It should be noted that references to an or one embodiment in this disclosure are not necessarily to the same embodiment, and such references mean at least one.

In general, the word module, as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable medium include CDs, DVDs, BLU-RAY, flash memory, and hard disk drives.

Figure 1:
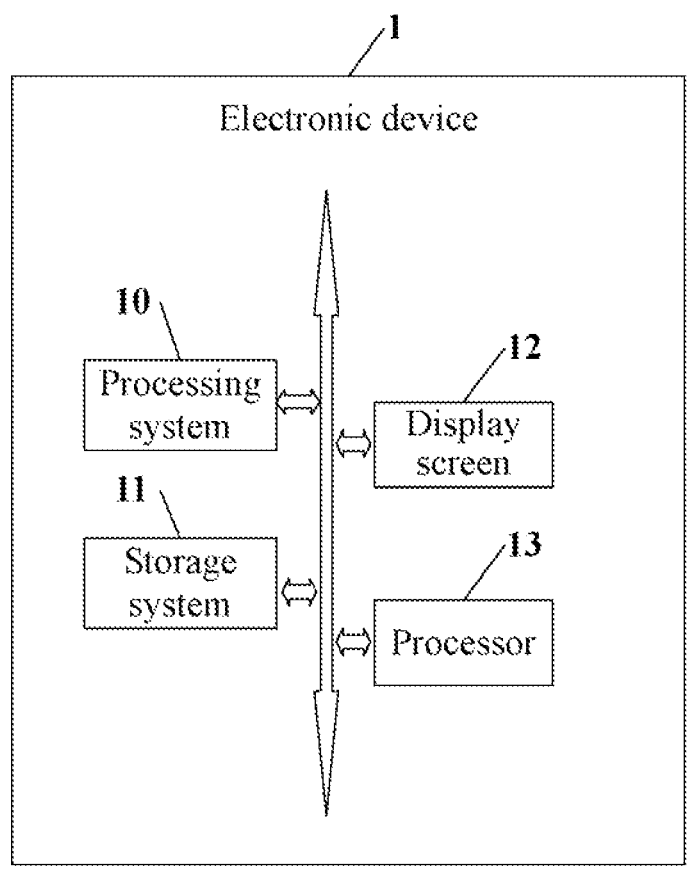
FIG. 1 is a block diagram of one embodiment of an electronic device including a processing system.

FIG. 1 is a block diagram of one embodiment of an electronic device 1 including a processing system 10. The electronic device 1 further includes a storage system 11 and a display screen 12. The storage system 11 stores data of the electronic device 1, such as, image files, for example. The display screen 12 displays visual data of the electronic device 1, such as, images of the electronic device 1. The processing system 10 sets an image file format for a double-sided image file called a "double-sided image file." The double-sided image file may be defined as a two-dimensional image having a front side and a back side. The double-sided image file can be formed from the merger of two image files with a first image file being displayed on the front side of the image and a second image file being displayed on the back side of the image.

In one embodiment, the storage system 11 may be a memory of the electronic device 1, or an external storage card, such as a smart media card, or a secure digital card. The electronic device 1 further includes at least one processor 13. The at least one processor 13 executes one or more computerized codes and other applications of the electronic device 1, to provide the functions of the processing system 10.

Figure 2:
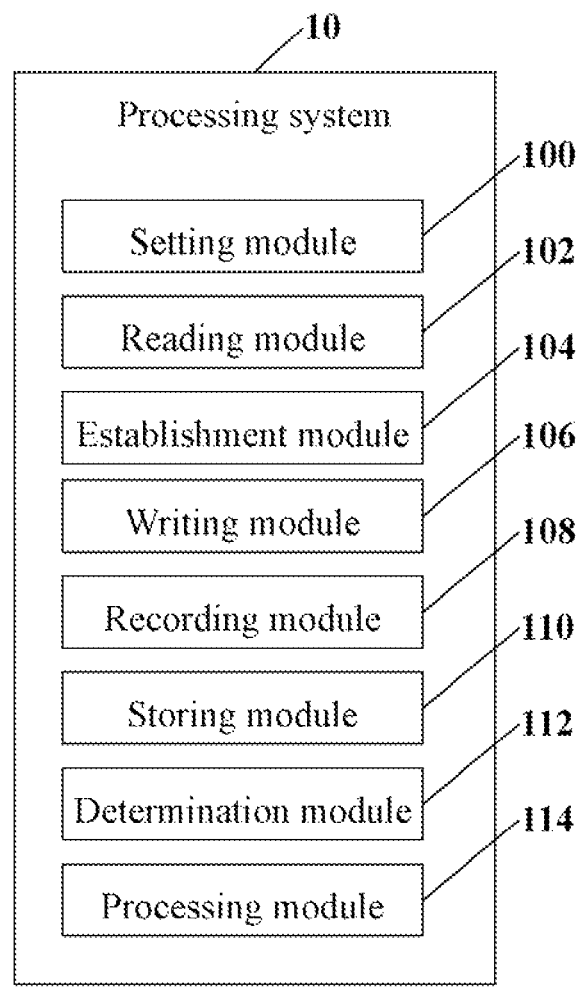
FIG. 2 is a block diagram of function modules of the processing system included in the electronic device of FIG. 1.

FIG. 2 is a block diagram of function modules of the processing system 10 included in the electronic device 1 of FIG. 1. In the embodiment, the processing system 10 may include a setting module 100, a reading module 102, an establishment module 104, a writing module 106, a recording module 108, a storing module 110, a determination module 112, and a processing module 114. The modules 100, 102, 104, 106, 108, 110, 112 and 114 comprise computerized codes in the form of one or more programs that are stored in the storage system 11. The computerized code includes instructions that are executed by the at least one processor 13 to provide functions for the modules. Details of these operations are as follows.

Figure 3:
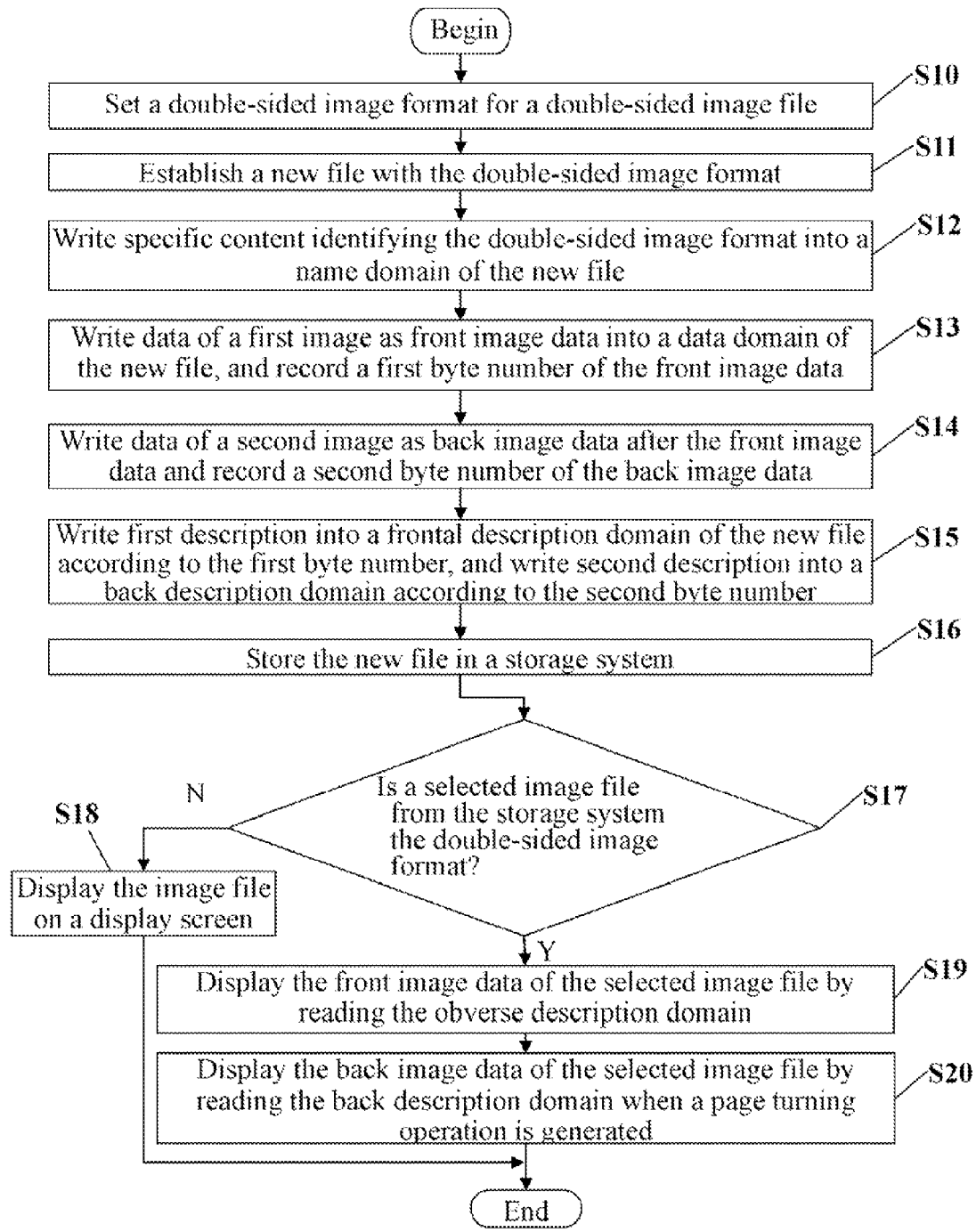
FIG. 3 is a flowchart of one embodiment of a method for processing images files in the electronic device of FIG. 1.

FIG. 3 is a flowchart of one embodiment of a method for processing images of the electronic device 1 of FIG. 1. Depending on the embodiment, additional blocks may be added, others deleted, and the ordering of the blocks may be changed.

In block S10, the setting module 100 sets a double-sided image format for a double-sided image file. The double-sided image file is set to include a name domain, a front description domain, a back description domain, and a data domain. Each of the name domain, the front description domain, and the back description domain is set a predetermined memory section including a starting memory address and an end memory address. The data domain has a predetermined starting memory address. For example, the memory section of the name domain may be set from the 1st byte to the 8th byte in data of the double-sided image file. The memory section of the front description domain may be set from the 9th byte to the 24th byte in the data of the double-sided image file. The memory section of the back description domain may be set from the 25th byte to the 40th byte in the data of the double-sided image file. The starting memory address of the data domain is from the 41st byte in the data of the double-sided image file.

In one embodiment, the name domain includes specific content to identify that the file is the double-sided image format, such as, the specific content may be decimal numbers "111 20 78 71 13 10 25 10" with eight bytes size, for example. The front description domain includes memory position of a front image data in the double-sided image file. The memory position includes a starting memory address and an end memory address. The back description domain includes the memory position of a back image data in the double-sided image file. The data domain may include original data (e.g. metadata) of two image files that are merged into the double-sided image file.

In block S11, the establishment module 104 establishes a new file with the double-sided image format, and data in the new file is null. The new file sets the name domain, the front description domain, the back description domain, and the data domain.

In block S12, the writing module 106 writes the specific content identifying the double-sided image format into the name domain of the new file.

In block S13, the reading module 102 reads a first image file and a second image file from the storage system 11. The writing module 106 writes data of the first image file as front image data into the data domain of the new file, and the recording module 108 records a first byte number of the front image data written into the data domain.

After all the data of the first image file has been written into the data domain, in block S14. The writing module 106 writes data of the second image file as back image data into the data domain after the front image data, and the recording module 108 further records a second byte number of the back image data written into the data domain.

After all the data of the second image file has been written into the data domain, in block S15. The writing module 106 writes a first description into the front description domain of the new file according to a starting memory address of the data domain and the first byte number, and writes a second description into the back description domain according to an ending memory address of the first memory position and the second byte number. The first description includes the memory position of the front image data in the new file, and the second description includes the memory position of the back image data in the new file.

After both the first description and the second description have been written into the new file, in block S16, the storing module 110 stores the new file with a predetermined file name into the storage system 11.

In block S17, if user selects an image file from the storage system 11 to view, the determination module 112 determines whether the selected image file from the storage system 11 is the double-sided image format by reading data of the selected image file. In one embodiment, if content of the front eight bytes in data of the selected image file is identical to the specific content identifying the double-sided image format, the determination module 112 determines that the selected image file is the double-sided image format, and block S19 is implemented. Otherwise, if the content of the front eight bytes is not identical to the specific content, the determination module 112 determines that the selected file is not the double-sided image format, and block S18 is implemented.

In block S18, the processing module 114 displays the selected image on the display screen 12, and the procedure ends.

In block S19, the processing module 114 reads front image data of the selected image file to display on the display screen 12, by reading the front description domain of the selected image file. In one embodiment, the processing module 114 further prompts that the front image is displayed on the display screen 12, such as displaying a prompt of "front image" on the display screen 12.

If a page turning operation is generated, in block S20, the processing module 114 reads back image data of the selected image file to display on the display screen 12, by reading the back description domain of the selected image file. In one embodiment, the processing module 114 further prompts that the back image is displayed on the display screen 12, such as displaying a prompt of "back image" on the display screen 12.

In some embodiment, if the double-sided image file is to be printed, both front image data and the back image data are read to display for users to choose. Users can choose the front image data and/or the back image data to print.

In one embodiment, the double-sided image file can be recovered to the two original image files. The processing module 114 stores the front image data according to the front description domain to be the first image file, and stores the back image data according to the back description domain to be the second image file.

All of the processes described above may be embodied in, and fully automated via, functional code modules executed by one or more general purpose processors. The code modules may be stored in any type of non-transitory readable medium or other storage device. Some or all of the methods may alternatively be embodied in specialized hardware. Depending on the embodiment, the non-transitory readable medium may be a hard disk drive, a compact disc, a digital video disc, a tape drive or other suitable storage medium.

The described embodiments are merely possible examples of implementations, and have been set forth for a clear understanding of the principles of the present disclosure. Many variations and modifications may be made without departing substantially from the spirit and principles of the present disclosure. All such modifications and variations are intended to be included herein within the scope of this disclosure and the described inventive embodiments, and the present disclosure is protected by the following claims.

What is claimed is:

1. A computer-implemented method for processing image files of an electronic device, the method comprising:
   setting a double-sided image format for a double-sided image file;
   establishing a new file with the double-sided image format, the new file setting a name domain, a front description domain, a back description domain, and a data domain;
   writing specific content identifying the double-sided image format into the name domain of the new file;
   writing data of a first image file from a storage system of the electronic device as front image data into the data domain of the new file, and recording a first byte number of the front image data written into the data domain;
   writing data of a second image file as back image data into the data domain after the front image data, upon the condition that all the data of the first image file has been written into the data domain;
   recording a second byte number of the back image data written into the data domain;
   writing a first memory position of the front image data in the new file into the front description domain of the new file according to a starting memory address of the data domain and the first byte number;
   writing a second memory position of the back image data in the new file into the back description domain according to an ending memory address of the first memory position and the second byte number; and
   storing the new file into the storage system.

2. The method as claimed in claim 1, further comprising:
   setting the double-sided image file including the name domain, the front description domain, the back description domain, and the data domain;
   setting each of the name domain, the front description domain, and the back description domain having a predetermined memory section that comprising the starting memory address and the end memory address in the double-sided image file;
   setting the data domain having a predetermined starting memory address; and
   setting specific content in the name domain to identify the double-sided image format.

3. The method as claimed in claim 2, further comprising:
   determining whether a selected image file from the storage system is the double-sided image format according to the name domain of the selected image file, upon the condition that the image is selected to scan from the storage system;
   displaying the selected image on a display screen of the electronic device, upon the condition that the selected image file is not the double-sided image format;
   reading front image data of the selected image file to display on the display by reading the front description domain of the selected image file;

reading back image data of the selected image file to display on the display screen by reading the back description domain of the selected image file, upon the condition that a page turning operation is generated.

4. The method as claimed in claim 3, further comprising:
displaying a first prompt that a front image of the selected image file is displayed on the display screen, in response to displaying the front image data;
displaying a second prompt that a back image of the selected image file is displayed on the display screen, in response to displaying the back image data.

5. The method as claimed in claim 1, wherein the double-sided image file is recovered to two original image files by storing the front image data according to the front description domain to be the first image file, and by storing the back image data according to the back description domain to be the second image file.

6. A non-transitory storage medium storing a set of instructions, the set of instructions capable of being executed by at least one processor of an electronic device, causes the at least one processor to perform a method for processing image files of the electronic device, the method comprising:
setting a double-sided image format for a double-sided image file;
establishing a new file with the double-sided image format, the new file setting a name domain, a front description domain, a back description domain, and a data domain;
writing specific content identifying the double-sided image format into the name domain of the new file;
writing data of a first image file from a storage system of the electronic device as front image data into the data domain of the new file, and recording a first byte number of the front image data written into the data domain;
writing data of a second image file as back image data into the data domain after the front image data, upon the condition that all the data of the first image file has been written into the data domain;
recording a second byte number of the back image data written into the data domain;
writing a first memory position of the front image data in the new file into the front description domain of the new file according to a starting memory address of the data domain and the first byte number;
writing a second memory position of the back image data in the new file into the back description domain according to an ending memory address of the first memory position and the second byte number; and
storing the new file into the storage system.

7. The storage medium as claimed in claim 6, wherein the method further comprises:
setting the double-sided image file including the name domain, the front description domain, the back description domain, and the data domain;
setting each of the name domain, the front description domain, and the back description domain having a predetermined memory section that includes the starting memory address and the end memory address in the double-sided image file;
setting the data domain having a predetermined starting memory address; and
setting specific content in the name domain to identify the double-sided image format.

8. The storage medium as claimed in claim 7, wherein the method further comprises:
determining whether a selected image file from the storage system is the double-sided image format according to the name domain of the selected image file, upon the condition that the image is selected to scan from the storage system;
displaying the selected image on a display screen of the electronic device, upon the condition that the selected image file is not the double-sided image format;
reading front image data of the selected image file to display on the display screen by reading the front description domain of the selected image file;
reading back image data of the selected image file to display on the display screen by reading the back description domain of the selected image file, upon the condition that a page turning operation is generated.

9. The storage medium as claimed in claim 8, wherein the method further comprises:
displaying a first prompt that a front image of the selected image file is displayed on the display screen, in response to displaying the front image data;
displaying a second prompt that a back image of the selected image file is displayed on the display screen, in response to displaying the back image data.

10. The storage medium as claimed in claim 6, wherein the double-sided image file is recovered to two original image files by storing the front image data according to the front description domain to be the first image file, and by storing the back image data according to the back description domain to be the second image file.

11. An electronic device, comprising:
a storage system;
at least one processor; and
one or more programs that are stored in the storage system and executed by the at least one processor, the one or more programs comprising:
a setting module operable to set a double-sided image format for a double-sided image file;
an establishment module operable to establish a new file with the double-sided image format, the new file setting a name domain, a front description domain, a back description domain, and a data domain;
a writing module operable to write specific content identifying the double-sided image format into the name domain of the new file, and write data of a first image file from a storage system of the electronic device as front image data into the data domain of the new file;
a recording module operable to record a first byte number of the front image data written into the data domain;
the writing module further operable to write data of a second image file as back image data into the data domain after the front image data, upon the condition that all the data of the first image file has been written into the data domain;
the recording module further operable to record a second byte number of the back image data written into the data domain;
the writing module further operable to write a first memory position of the front image data in the new file into the front description domain of the new file according to a starting memory address of the data domain and the first byte number, and write a second memory position of the back image data in the new file into the back description domain according to an ending memory address of the first memory position and the second byte number; and
a storing module operable to store the new file into the storage system.

12. The electronic device as claimed in claim 11, wherein the setting module is further operable to:

set the double-sided image file that includes the name domain, the front description domain, the back description domain, and the data domain;

set each of the name domain, the front description domain, and the back description domain having a predetermined memory section that includes a starting memory address and an end memory address in the double-sided image file;

set the data domain having a predetermined starting memory address; and set specific content in the name domain to identify the double-sided image format.

13. The electronic device as claimed in claim 12, wherein the one or more programs further comprises:

a determination module operable to determine whether a selected image file from the storage system is the double-sided image format, according to the name domain of the selected image file;

a processing module operable to display the selected image on a display screen of the electronic device, upon the condition that the selected image file is not the double-sided image format; and the processing module further operable to read front image data of the selected image file to display on the display screen by reading the front description domain of the selected image file, and read back image data of the selected image file to display on the display screen by reading the back description domain of the selected image file, upon the condition that a page turning operation is generated.

14. The electronic device as claimed in claim 13, wherein the processing module further operable to:

display a first prompt that a front image of the selected image file is displayed on the display screen, in response to displaying the front image data; and display a second prompt that a back image of the selected image file is displayed on the display screen, in response to displaying the back image data.

15. The electronic device as claimed in claim 11, wherein the double-sided image file is recovered to two original image files by storing the front image data according to the front description domain to be the first image file, and by storing the back image data according to the back description domain to be the second image file.

* * * * *